US008666048B2

(12) United States Patent
Beerse et al.

(10) Patent No.: US 8,666,048 B2
(45) Date of Patent: *Mar. 4, 2014

(54) LOCATION BASED QUALITY OF SESSION CONTROL IN UNIFIED TELEPHONY

(75) Inventors: Chelsea C. Beerse, Fairport, NY (US); Patrick J. O'Sullivan, Dublin (IE); Jeffrey B. Sloyer, Fishersville, VA (US); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 12 days.

This patent is subject to a terminal disclaimer.

(21) Appl. No.: 13/449,676

(22) Filed: Apr. 18, 2012

(65) Prior Publication Data

US 2013/0279677 A1    Oct. 24, 2013

(51) Int. Cl.
*H04M 3/42* (2006.01)
(52) U.S. Cl.
USPC ....... 379/202.01; 370/261; 709/204; 709/227
(58) Field of Classification Search
USPC ............... 379/202.01; 370/261; 709/204, 227
See application file for complete search history.

(56) References Cited

U.S. PATENT DOCUMENTS

| 7,356,340 | B2 * | 4/2008 | Hamilton | 455/446 |
|---|---|---|---|---|
| 7,675,873 | B2 | 3/2010 | Krstulich | |
| 2006/0023061 | A1 * | 2/2006 | Vaszary et al. | 348/14.08 |
| 2010/0080374 | A1 | 4/2010 | Hepworth et al. | |
| 2012/0082304 | A1 * | 4/2012 | Byrne et al. | 379/202.01 |

* cited by examiner

*Primary Examiner* — Quynh Nguyen
(74) *Attorney, Agent, or Firm* — Patents on Demand P.A.; Brian K. Buchheit; Scott M. Garrett

(57) ABSTRACT

Implementing a location and historical trend based quality of session in unified telephony can begin with establishing a conference call. The location of each end-user device can be determined and a query of a previously established data store with historical trend data for quality of session for each end-user device based on the location of an identifier for the end user device can be performed. If the results of the querying indicate that an end-user device has a relatively low quality of session below a baseline established for the conference call, a corrective action designed to ensure the conference call is conducted with a quality of session at or above the baseline can be performed. Alternatively, the location and historical trend data and analysis for the collaboration session can be presented to a human moderator, who can be prompted to select a desired corrective action.

19 Claims, 3 Drawing Sheets

300

Session Overview GUI 310

Quality of Session Determination    320

Sample every [10 Minutes] ~322
Alert when quality of session changes by [10%] ~324

Current Session Data    330
Current quality of collaboration: Moderate ~332

~334
Devices negatively affecting current session:
   Device C – Location: Public Coffee Shop A ~335
   Location specific quality of session for Device C:
     current quality of session: bad
     historical quality of session: good ~336
Recommended action: Mute Device C
(Perform Action)  (Select Another Action)
337 ⤴                ⤵ 338
View details for all devices in current session   340

---

Configure Default Corrective Actions GUI 350

Corrective Action Handler Defaults    360
☒ Always perform automatic corrective action ~362    363
   Default action (unless frequent location configured) [Apply filter] ⤵
☐ Always prompt moderator for action selection ~364

Default Action at Frequent Locations:    370
~372
At location "Public Coffee Shop A": [mute]    ~374
  perform corrective action only: [11:30am – 2:00pm]
         375 ⤴ View historical graph
                        ~376
At location "Main Office": [Prompt user to switch device]

Location Historical Quality Graph   375
~378
Add new frequent location

Public Coffee Shop A - Time

FIG. 3

LOCATION BASED QUALITY OF SESSION CONTROL IN UNIFIED TELEPHONY

BACKGROUND

The present invention relates to the field of quality of session control, and more specifically to location and historical trend based quality of session in unified telephony systems.

Globalization and the advance of technologies have led to a widespread distribution of the work force with more and more individuals working outside of a traditional office setting. Individuals may work from their homes, coffee shops, on the road, from hotel rooms, and the like. Taking this geographical distribution of the workforce into consideration, phone or video conferences often times replace, at least in part, face to face meetings.

Some participants of these telephone or even video conferences do not always have control over their immediate environments or quality of connection to the collaboration session. These factors have a potential to negatively impact the quality of collaboration during a conference. Background noise, such as a dog barking or the sound of traffic, as well as a bad signal or connection can introduce troublesome distractions. As stated, these distractions adversely affect the productivity of the work team during phone or video conferences and can even render them entirely unproductive.

BRIEF SUMMARY

One aspect of the disclosure can include a method for implementing location and historical trend based quality of session in unified telephony. Such a method can begin with establishing a conference call with a plurality of participants. Subsequently, the method can determine a location of each end-user device used for the conference call and query a previously established data store with historical trend data for quality of session for each end-user device based on the location of an identifier for the end user device. If the results of the querying indicate that an end-user device has a relatively low quality of session below a baseline established for the conference call, the method can continue with automatically performing a corrective action designed to ensure the conference call is conducted with a quality of session at or above the baseline. Alternatively, the method can neglect performance of an automated corrective action in favor or passing the corrective action on to a designated human moderator.

Another aspect of the disclosure can include a system for implementing location and historical trend based quality of session in unified telephony. Such a system can include a location identifier, a quality of session identifier, a data store, and a corrective action handler. The location identifier can resolve the location for a given end-user device. The quality of service identifier can launch a query against the data store in order to determine historical trend data as well as location call quality for one or more specific end-user devices and can selectively determine the call quality for one or more specific end-user devices taking part in a conference call. The data store can be a previously established data store that can index and maintain information regarding different expected quality of session levels against different locations of various end-user devices. The corrective action handler can either automatically take action such as muting the offending user's end-device and the like, or pass the information on to a moderator to make a decision regarding whether or not to take a corrective action, and if so, which corrective action to take.

Yet another aspect of the disclosure can include a computer program product that includes a computer readable storage medium having embedded computer usable program code. The computer usable program code can be configured to establish a conference call with a plurality of participants. The computer usable program code can be further configured to determine a location and call quality of each end-user device that joins the conference call. Subsequently, if the determined audio quality of one of the end-devices is below a baseline quality level established for a conference call, the computer usable program code can be configured to automatically perform a corrective action to ensure the conference call is conducted with a quality of session at or above the baseline quality level. Alternatively, the computer usable program code can be configured to forego performing an automated corrective action but presenting the gathered session quality information to a session moderator and prompting him or her to determine a course of corrective action to be taken.

BRIEF DESCRIPTION OF THE SEVERAL VIEWS OF THE DRAWINGS

FIG. 3 is a depiction of a number of GUIs for corrective action moderator settings and preferences for implementing location and historical trend based quality of session control in a unified telephony system in accordance with embodiments of the inventive arrangements disclosed herein.

DETAILED DESCRIPTION

Figure 1:
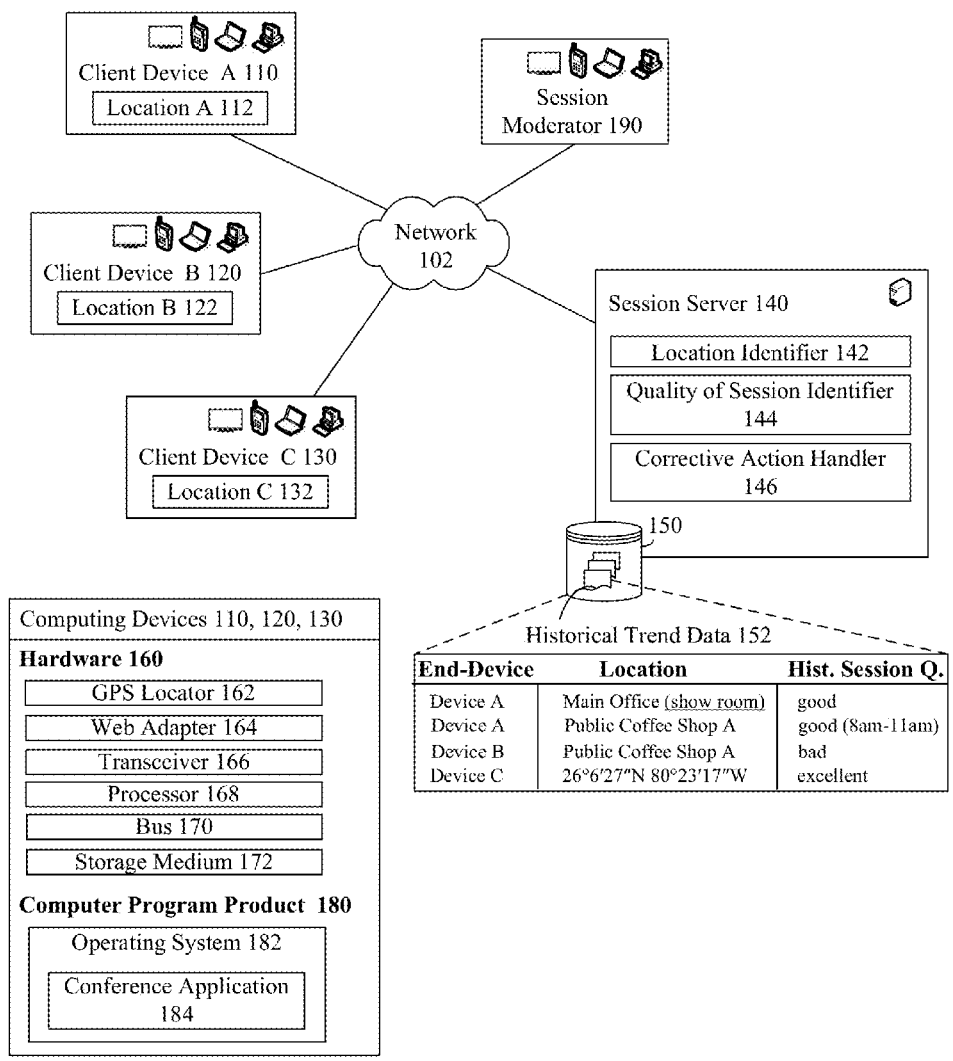
FIG. 1 is a schematic diagram illustrating a system for implementing location and historical trend based quality of session control in a unified telephony system in accordance with embodiments of the inventive arrangements disclosed herein.

Attempts to solve the problem of poor quality of collaborations during conference calls place the burden of correcting for distractions introduced by one or more end-device's poor quality of session (i.e., poor quality of transmission and/or a high level of environment noise) on conference participants and can often be cumbersome, time consuming or even impossible to correct for. The disclosure can provide a solution to the problem of negatively impacted conference productivity caused by one or more device's poor quality of session. The disclosure provided solution can determine a user's location and take corrective action if the system notices a user's end-device has had problems with audio quality (be it transmission noise or environment noise) at a specific location in the past.

In one embodiment, the system can establish the user's end-device's location and store the information in a data store. Subsequently, the disclosed innovation can compare the current user's end-device's quality of session with previous historical trend data that the system has stored. In this embodiment, if the system determines that the end-device at the specific location has poor historical quality of session and the current quality of session is poor, the system can take corrective action. This corrective action could be, but is not limited to, placing the user on mute so they do not introduce further unwanted noise into the conference call session.

In another embodiment, if the system determines that the user's end-device's current quality of session at the specific location is good and the user's device's historical quality trend data at the current location is poor, the user or moderator could receive a prompt notifying them that user "XYZ" has joined and they have had poor audio quality at their location in the past but current quality of session is good; the system could along with the prompt provide options for a moderator to select such as placing the user on mute or not.

In another embodiment, if there is a continued trend of poor quality of session at a certain location, the disclosed system could notify the moderator and/or other users in the meeting/call that user "ABC" has had continued audio problems at their current location. Armed with this information the moderator and/or other users could, in this embodiment, prompt the offending user not to call in from that specific location in the future or to use a different device to participate in the conference session from that location.

An additional benefit of the current disclosure can be that shared trend data can uncover additional metrics on devices' quality of sessions. For example, the system could with prolonged data sampling that a specific conference room's end-device in a building has a poor quality microphone. The device can then be automatically placed on mute or even alert an operator or moderator to replace the faulty device. This setting can be applied to any user that calls into a meeting from a certain shared location. However, if the device is replaced the system would recognize the new device and reevaluate quality of session at the specific location based on the new device.

This shared trend data handling of "public devices" (i.e., devices shared by multiple users such as a meeting room's speakerphone) versus "private devices" (i.e., a user's personal mobile phone that is not shared for use by other individuals) can provide socially driven historical tend data that can be utilized to identify locations of poor quality of sessions for specific devices during a conference call and take corrective actions before a future conference session's quality of collaboration can be negatively impacted.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 for implementing location and historical trend based quality of session control in a unified telephony system in accordance with embodiments of the inventive arrangements disclosed herein. System 100 shows a number of client end-devices 110, 120, 130 at locations 112, 122, 132 that include hardware 160 and one or more computer program products 180. The computing device 110, 120, 130 can be any mobile apparatus or device capable of participating in a conference call session hosted by session server 140 via network 102.

The computing devices 110, 120, 130 can be, but are not limited to, a personal computer, a smart phone, and the like. Devices 110, 120, 130 can be a general purpose computing device able to have its functionality modified by updating or changing installed applications, can be a special purpose computing device designed for a specific set of functionality that is not user modifiable (or minimally so, such as through a firmware upgrade), or can be a device with an intermediate level of user modifiability (i.e., plug-ins or apps can be installed by a user who is otherwise not able to modify core functionality of the device).

The hardware 160 of computing devices 110, 120, 130 can include GPS locator 162 and web adapter 164. GPS locator 162 can be utilized to keep track of the device's geographical location (e.g., client device A 110's current location A 112, client device B 120's current location B 122, and client device C 130's current location C 132). Alternately, web adapter 164 can be utilized to provide the capability to triangulate a device position based on the nearest available wireless networks. GPS locator 162 and web adapter 164 can function in conjunction with computer program products 180 and session server 140's location identifier 142. It should be noted that other viable methods of detecting a device's location are contemplated.

The hardware 160 of computing devices 110, 120, 130 can also include one or more processors 168 able to execute programmatic instructions of one or more computer program products 180. The processor 168 can be connected to other hardware 180 components, which include storage medium 172, via a bus 170. Storage medium 172 can be a non-transitory storage medium, such as a hard drive, Random Access Memory (RAM), a solid state drive, an optical storage medium (DVD disk, BLU-RAY disk), and the like. Hardware 160 can include ports for interacting with external output (e.g., transceiver 166) components or can include one or more embedded or integrated output components (transceiver 166).

Transceiver 166 can receive and transmit signals in accordance with an embodiment of the disclosure. For example, the transceiver can include one or more antennas. The antenna(s) can take the form of any known antenna, including but not limited to, a bistatic, a monostatic, a dipole, a dual dipole, an isotropic or a slotted antenna. Computing device 110, 120, 130 can utilize a single antenna for all of its purposes (connecting to a conference call in a variety of manners such as over wifi, 3G, and the like), or can alternatively utilize one antenna to receive signals and another antenna to send signals. Signals received and transmitted can include, but are not limited to, voice communication signals.

The computer program products 180 of computing device 110, 120, 130 can include an operating system 182, and one or more applications (such as conference application 184) executing on top of the operating system, firmware, and the like. Applications 148 can, for instance, be an application that can allow device 110, 120, 130 user to participate in a conference call hosted by session server 140. Each one of the applications can have multiple sub-applications.

Session server 140, responsible for hosting the conference call between devices 110, 120, 130 at their respective locations 112, 122, 132 and maintaining an overall quality of session or collaboration within determined parameters can include a location identifier 142, quality of session identifier 144, corrective action handler 146, and data store 150.

Location identifier 142 can determine the locations (e.g., location A 112, location B 122, and location C 132) for each given end-user device 110, 120, 130 participating in the conference call hosted by session server 140 via network 102. Locations 112, 122, 132 can be recorded in data store 150 as sets of latitudinal and longitudinal coordinates, reference names (such as "Main Office"), types of locations (such as "Public Coffee Shop A"), and the like. Each location 112, 122, 132 can be recorded in data store 150 as being associated with the respective end device 110, 120, 130 along with a device 110, 120, 130's respective historical quality of session for the device at the recorded location.

Quality of session identifier 144 can determine a client device 110, 120, 130's current quality of session at their respective locations 112, 122, 132. Quality of session as used herein pertains to both quality of connection or transmission noise (quality of service or transport fidelity related concerns such as poor connection, transmission noise, and the like) as well as other factors affecting a conference call's quality of collaboration or overall effectiveness and productivity. Such other factors can be in the form of environment noise (for example, excessive background noise that can interfere with properly distinguishing a device user's contribution to a conference call).

It should be understood that just like transmission noise (where different locations offer different devices 110, 120, 130 different signal strengths for various end-device service provider's types of networks), environment or background noise can differ at each location that a single end-device can be used. For example, a user participating in a conference call from his or her home may introduce environment noise in the form of a dog barking, while the same user utilizing his or her same device at a public coffee shop may experience background noise from traffic or other café patrons.

Additionally, specific devices may be more or less well equipped to deal with a certain amount of background noise so that quality of session measures for different devices at the same location at the same time may, in some circumstances, differ significantly. For example, in one embodiment, one user can be utilizing his or her mobile device at an office location and be exposed to a significant amount of background noise and thus experience an overall bad quality of session, while a second user utilizing his or her mobile phone in the same office location experience at the same time may have a good quality of session experience due to additional noise filter functionality built into his or her device. In another embodiment, an end-device may be recording the user's conference input via a headset introducing additional noise or the like.

Background noise can also differ drastically during different times of the day, leaving some devices with a historical quality of session that can be further defined for varying time intervals. For example, during lunchtime public coffee shops and the like, which otherwise would provide a certain end-device with a good quality of session experience, may be noisier due to a higher percentage of patrons in the establishment, and the like. In this manner, location and time based quality of session tracking can provide a perceptual value of a quality of session based on a time nexus for a certain environment. It should be understood that the elaborations on background noise are not intended to be limiting and other factors or circumstances affecting a device's quality of session during a given conference call from a specific location are contemplated.

Quality of session identifier 144 can further perform a query against the data store 150 records 152 in order to determine historical trend data 152 in the form of location specific quality of session information for one or more specific end-user devices taking part in a conference call. The quality of session identifier 144 can pass the information gathered and any potential comparisons or quality of session benchmark values calculated on to the corrective action handler 146 to be processed for a potential corrective action response.

An optional corrective action handler 146 can either automatically take action such as muting the offending user's end-device 110, 120 or 130 and the like, or pass the information on to a session moderator 190 to make a decision regarding whether or not to take a corrective action, and if so, which corrective action to take. It should be noted that in one embodiment a session moderator 190 can be one of the participating individuals of the conference (such as the user utilizing device 110, 120, 130). In another embodiment, session moderator 190 can be a third party service and non-participant in the conference itself, contracted to oversee the overall quality of session or collaboration of the conference regardless of the conference call's content.

Session moderator 190 options (expounded upon further in FIG. 3) can include but are not limited to adding gathered information to sample data store 150, muting a user's end device, prompting a user with a quality of collaboration offending device to call into the conference with a different device, applying digital single processing in the form of a filter or the like for incoming content per channel (if each end-device is connected via a different channel), and the like. These options can be selected upon to ensure that a conference call is conducted with a certain overall quality of session or collaboration.

Data store 150 can contain historical trend data 152 indexing each end-device's quality of session during conference calls indexed by the location the specific end device was utilized at as well as optional information such as whether or not a corrective action was performed and if so what the corrective action was. As such, the historical trend data store 150 can act as a data store for geospatial profiles of connectivity by being a previously established data store that can index and maintain information regarding different expected quality of session levels against different locations of various end-user devices. In such a manner the location variable can be utilized as context to treat sampling that the quality of session identifier performs in a different fashion than conventionally applied.

As used herein, presented data store 150 can be a physical or virtual storage space configured to store digital information. Data store 150 can be physically implemented within any type of hardware including, but not limited to, a magnetic disk, an optical disk, a semiconductor memory, a digitally encoded plastic memory, a holographic memory, or any other recording medium. Data store 150 can be a stand-alone storage unit as well as a storage unit formed from a plurality of physical devices. Additionally, information can be stored within data store 150 in a variety of manners. For example, information can be stored within a database structure or can be stored within one or more files of a file storage system, where each file may or may not be indexed for information searching purposes. Further, data store 150 can utilize one or more encryption mechanisms to protect stored information from unauthorized access.

Network 102 can include any hardware/software/and firmware necessary to convey data encoded within carrier waves. Data can be contained within analog or digital signals and conveyed though data or voice channels. Network 102 can include local components and data pathways necessary for communications to be exchanged among computing device components and between integrated device components and peripheral devices. Network 102 can also include network equipment, such as routers, data lines, hubs, and intermediary servers which together form a data network, such as the Internet. Network 102 can also include circuit-based communication components and mobile communication components, such as telephony switches, modems, cellular communication towers, and the like. Network 102 can include line based and/or wireless communication pathways.

Figure 2:
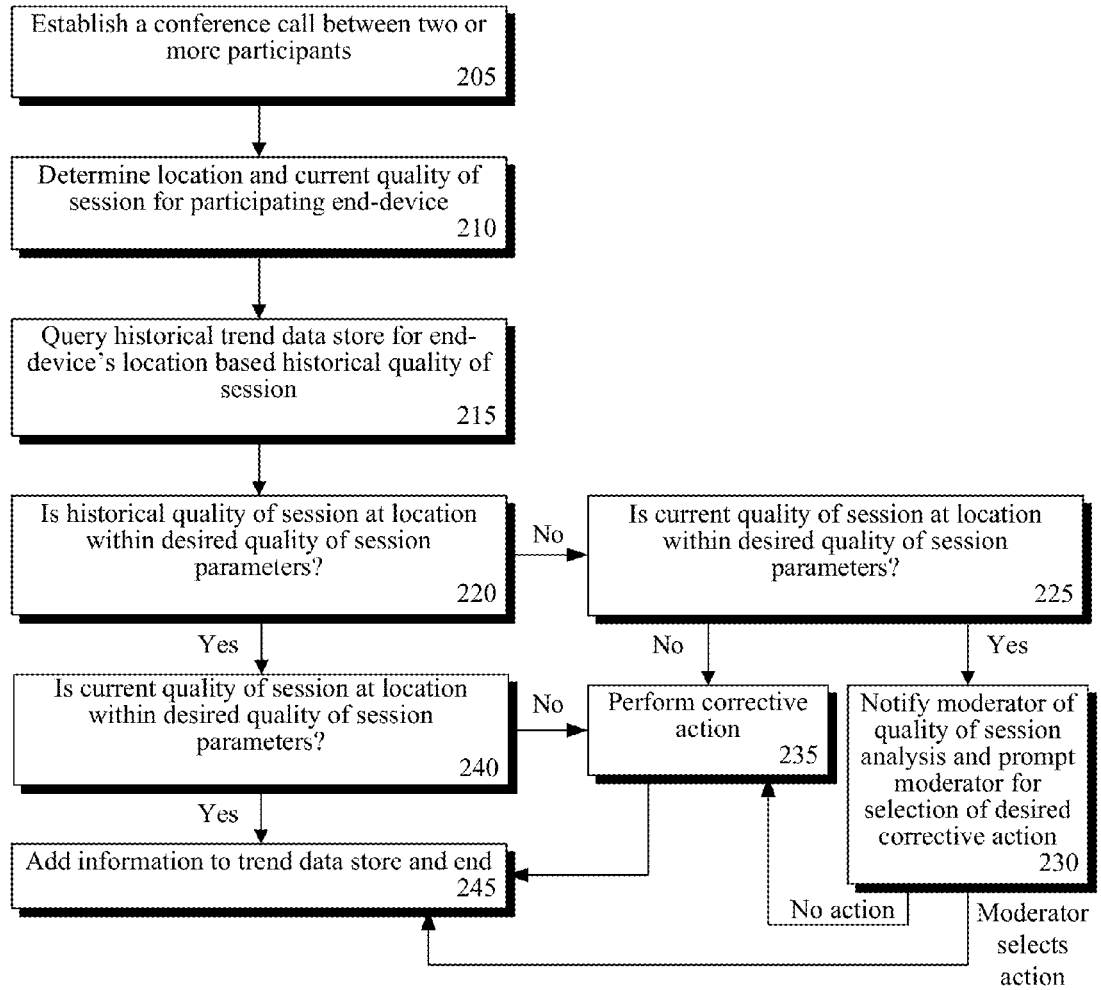
FIG. 2 is a flow chart of a method for implementing location and historical trend based quality of session control in a unified telephony system in accordance with embodiments of the inventive arrangements disclosed herein.

FIG. 2 is a flow chart of a method 200 for implementing location and historical trend based quality of session control in a unified telephony system in accordance with embodiments of the inventive arrangements disclosed herein.

Method 200 can begin with step 205, during which a conference call between two or more participants utilizing end-devices can be established. It should be understood that the following steps (step 210 through step 245) can be performed for each participating device. In step 210, the method can determine the location and current quality of session for each participating end-device. The method can then proceed to step 215, during which a query of the pre-established historical trend data store is performed for each participating end-device's location based historical quality of session.

In step 220, the method performs a check as to whether or not the historical quality of session at the device's current location within desired quality of session parameters. Should it be determined that the historical quality of session for a device at a current location is not within desired quality of session parameters (i.e., historical quality of session is bad), the method can proceed to step 225. In step 225, it is determined whether or not the current quality of session is within desired parameters.

If it is determined that the current quality of session is not within parameters (i.e., historical quality of session is bad and current quality of session is bad), the method can move directly to step 235, where a corrective action is performed. From there, the method can move to step 245, save the gathered information and end.

If, on the other hand, the current quality of session is determined to be "good" (i.e., within parameters), the method can in step 230 notify the moderator of the quality of session analysis (i.e., that the historical quality of session at the location for the specific end-device is bad but the current quality of session is good) and can also prompt the moderator to select a desired corrective action to be performed. Optionally, the prompt can also include a recommendation of an appropriate corrective action, for example based on historical trend data store information.

If moderator selects an action to perform, the method can move to step 235, where the corrective action is performed and subsequently move to step 245. If, on the other hand, the moderator selects not to perform a corrective action, the method can move directly to step 245. During step 245, the gathered information can be added to the trend data store and end.

If, after step 220, it is determined that the historical quality of session at the end-device location is within desired quality of session parameters, the method can proceed to step 240, where similar to step 225, it is determined whether or not the current quality of session at the end-device's location is within desired quality of session parameters to maximize overall quality of collaboration within the in step 205 established conference call.

Should the current quality of session at the current location not be within established parameters (i.e., historical quality of session is good and current quality of session is bad), the method can move to step 230 and perform a corrective action. This can be followed by step 245, during which the information on the current quality of session information and any corrective action performed can be added to the trend data store for future use or analysis and the method can end.

If in step 240 it is determined that the current quality of session is in fact within desired quality of session parameters (i.e., the historical quality of session is good and the current quality of session is good), the method can proceed directly to step 245, wherein the gathered information can be added to the trend data store and the method can end. It should be noted that the preceding flowchart of method 200 is for illustrative purposes only and other combinations of steps are contemplated.

FIG. 3 is a depiction 300 of a number of GUIs 310, 350, 375 for corrective action moderator settings and preferences for implementing location and historical trend based quality of session control in a unified telephony system in accordance with embodiments of the inventive arrangements disclosed herein. It should be noted that the GUIs presented in FIG. 3 and described in detail below are not intended to be limiting and additional location and historical trend data related session moderator governed corrective actions and configurations are contemplated.

Session Overview GUI 310 can in one embodiment allow for customization of quality of session determination parameters 320 and current session data and options 330. Quality of session determination 320 can include, but is not limited to, options such as setting a continuous sample rate 322 to determine if a user has moved from his or her conference call participation location during the call and alert the moderator if a predetermined quality of session change 324 occurs. For example, a user may be participating in a conference call with his or her end-device starting out in a public café but may continue to participate on his or her walk back to the office. As such, factors affecting an end-device's quality of session may change during a single conference call due to a location change.

Current session data 330 panel can summarize a number of factors for a session moderator 190 to have a quick and efficient overview of the current quality of collaboration 332 within the conference, devices negatively affecting 334 the conference quality of session along with their details 335, as well as any recommended actions 336 to be taken to improve a an overall quality of session. The negatively affecting device information or elaboration 335, can in one embodiment, include location specific information for the device such as a current as well as historical quality of session for the device at the exact location. Additional details to be presented to the session moderator 190 are contemplated.

The recommended action 336 can be followed by two radio buttons; one button 337 can be to perform the action, while another button 338 can be to select another option to perform to adjust an overall quality of collaboration of a conference call. Pane 320 of current session data can also include an option 340 for the moderator to view details for all devices in the current conference call session.

Configure default corrective actions GUI 350 can include sections for configuring corrective action handler defaults 360 as well as location specific defaults 370. Corrective action handler defaults 360 pane can include options for handling corrective actions, such as an option 362 to always perform an automatic corrective action if session server 140 determines it necessary as well as an accompanying field 363 to specify the default corrective action to be performed (in this instance the action of applying a noise filter) regardless of end-device location. Another option 364 (in place of option 363) can be to always prompt a session moderator 190 for corrective action selection. The session moderator 190 options can be presented to him or her for every instance and device in need of an adjustment o correction to increase overall conference quality of collaboration.

Default action at frequent locations pane 370 (location configuration) can address device and location specific options, or as shown in GUI 350 simply location specific options in general regardless of which user device is at the specified location. Default action at frequent locations 370 can allow a user to manually add new frequent locations via a link 378 or in another embodiment, the session manager 140 can be tasked with auto-populating default actions based on historical quality of session data 152 captured in data store 150.

Specific location defaults can in one embodiment be, for example, for each caller calling from "public coffee shop A" a default corrective action 372 can be to mute the device. Further detailed instructions can specify that the corrective action 372 should only be applied during a certain time frame 374.

In one embodiment, the time frame 374 can be based on analysis of a historical quality of session data at the specific location (as shown in a visual analysis by graph 375). Such a historical quality of session data can be based on collective historical quality of session data (i.e., not device specific but rather a data gathering of every device or a set of specific devices previously participating in a conference call from the specific location). Alternatively, it can be device specific historical information (for example, an analysis can be conducted based on a single "benchmark device" historical quality of session data at the location).

The benefit to utilizing location as a marker for an end-device corrective action can be that it allows for greater analysis of available and/or appropriate corrective actions to be taken within a conference call to increase a collective quality of session or conference collaboration. An end-device at the "public coffee house A" location may allow for a corrective action of muting 374, while an end-device in a "main office" location may require another corrective action 376 of replacing the end-device utilized for participating in the conference due to a large number of participants utilizing the same shared device (e.g., speakerphone in a meeting room).

It should be noted that the auto-corrective actions discussed in FIGS. 1-3 are directed to several perspectives of controlling end-device participation in a conference call. Some of these perspectives can be audio quality of session (affected by transmission noise and background noise), device information (which can include device specific hardware such as noise filters, attached headsets or speakerphone devices, and the like), as well as device type (private device versus publically shared device). Auto-corrective actions can be configured, for example, based on a location specific current quality of session and that location's historical quality of session analysis. In another instance auto-corrective actions can be configured based on a user specific device current quality of session and that specific device's historical quality of session trend analysis. In yet another embodiment, auto-corrective actions can be based on a user's end-device location and type of device (whether the device is private or public).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system comprising:
a server device, wherein the server device can establish a conference call between two or more participants using end-devices to connect to said conference call;
a location identifier, wherein the location identifier can detect a current location for a plurality of end-devices participating in a conference call;
a historical trend data store, wherein the historical trend data store can maintain quality of session data at specific locations for specific end-devices having participated in a previous conference call;
a quality of session identifier, wherein the quality of session identifier can query a historical trend data store for historical quality of session trend data for each of the end-devices at their detected current locations, and wherein the quality of session identifier can analyze current and historical quality of session data to determine whether it meets a pre-established threshold for a desired quality of session; and
a corrective action handler, wherein the corrective action handler can perform an automated corrective action based on the determination of the quality of session identifier, wherein the corrective action is based on both one or more characteristics of the end-user device and the location of the end-user device, wherein the location identifier continues sampling device specific location information at a predetermined interval and adjusts the corrective actions based on detected changes in location of the specific end-device for the duration of the conference call.

2. The system of claim 1, wherein the corrective action alerts a moderator of the conference call that an audio quality associated with a user utilizing the end-user device is of the relatively low quality and prompts the moderator to select from among a set of corrective actions to be taken.

3. The system of claim 1, wherein the corrective action is applied only during select timeframes, wherein the timeframes are times during the day at a specific location during which historical data shows that the quality of session regardless of device is on average a bad quality of session.

4. The system of claim 1, wherein the corrective action handler continues sampling device location specific quality of session during a conference session at a predetermined interval and adjusts the corrective actions based on detected changes of quality of session during the ongoing conference call.

5. A non-transitory computer readable storage medium having computer usable program code embodied therewith, the computer usable program code comprising:
computer usable program code configured to establish a conference call between a plurality of participants;
computer usable program code configured to determine a current location for each end-user device that joins the conference call;
computer usable program code configured to query a previously established historical quality of session trend data store for each device's historical quality of session parameters based on the end-device's respective current locations;
computer usable program code configured to, if the determined quality of session of one or more of the end-devices is below a baseline quality level established for a conference call, automatically perform a corrective action to ensure the conference call is conducted with an overall quality of session at or above the baseline quality level, wherein the corrective action is based on both one or more characteristics of the end-user device and the location of the end-use; and
computer usable program code configured to, continue sampling device specific location information at a predetermined interval and to adjust the corrective actions based on detected changes in location of the specific end-device for the duration of the conference call.

6. The storage medium of claim 5
further comprising:
computer usable program code configured to determine a current audio quality of each of the end-devices that join the conference call; and
if the determined audio quality of one of the end-devices is below a baseline quality level established for the conference call, automatically performing a corrective action designed to ensure the conference call is conducted with a quality of service at or above the baseline quality level.

7. The storage medium of claim 5, wherein the corrective action alerts a moderator of the conference call that an audio quality associated with a user utilizing the end-user device is of the relatively low quality and prompts the moderator to select from among a set of corrective actions to be taken.

8. A computer system comprising:
one or more processors, one or more computer-readable memories and one or more computer-readable, tangible storage devices;
program instructions, stored on at least one of the one or more storage devices for execution by at least one of the one or more processors via at least one of the one or more memories, to establish a conference call with two or more people;
program instructions, stored on at least one of the one or more storage devices for execution by at least one of the one or more processors via at least one of the one or more memories, to determine a location of each end-user device used for the conference call;
program instructions, stored on at least one of the one or more storage devices for execution by at least one of the one or more processors via at least one of the one or more memories, to query a previously established datastore based on the location and an identifier for the end-user device, where the datastore indexes different expected quality of service levels against different locations;
program instructions, stored on at least one of the one or more storage devices for execution by at least one of the one or more processors via at least one of the one or more memories, to, if results of the querying indicate that an end-user device has a relatively low quality of session below a baseline established for the conference call, automatically perform a corrective action designed to ensure the conference call is conducted with a quality of session at or above the baseline, wherein the corrective action is based on both one or more characteristics of the end-user device and the location of the end-user device; and program instructions, stored on at least one of the one or more storage devices for execution by at least one of the one or more processors via at least one of the one or more memories, to, continue sampling device specific location information at a predetermined interval and to adjust the corrective actions based on detected changes in location of the specific end-device for the duration of the conference call.

9. The computer system of claim 8, wherein the relatively low quality of session indicates that a microphone of the end-user device introduces a level of background or transmission noise into the conference call over a desired baseline level for the conference call.

10. The computer system of claim 8, wherein the corrective action taken automatically places the end-user device with the relatively low quality of session in a mute state.

11. The computer system of claim 8, wherein the corrective action alerts a moderator of the conference call that an audio quality associated with a user utilizing the end-user device is of the relatively low quality and prompts the moderator to select from among a set of corrective actions to be taken.

12. The computer system of claim 8, wherein the corrective action is to prompt the user of the end-user device to utilize their end-user device in a different manner, wherein the different manner can be one of turning off speaker phone, disconnecting headset introducing noise, and activating a noise filter if available.

13. The computer system of claim 8, wherein the corrective action is applied only during select timeframes, wherein the timeframes are times during the day at a specific location during which historical data shows that the quality of session regardless of device is on average a bad quality of session.

14. The computer system of claim 8, wherein the location identifier continues sampling device specific location information at a predetermined interval and adjusts the corrective actions based on detected changes in location of the specific end-device for the duration of the conference call.

15. The computer system of claim 8, wherein the location of the each end-user device is determined based on Global Positioning System (GPS) technology.

16. The computer system of claim 8, wherein the corrective action taken is to prompt a user to replace a faulty end-user device, wherein a faulty status of the end-user device is determined based on current quality of session for the end-user device and the data in the data store.

17. The computer system of claim 8, wherein the corrective action taken is to prompt a user not to use a particular end-user device at a particular location for the conference call.

18. The computer system of claim 8, wherein the corrective action taken is to prompt a user to use a different end-user device, when a noisy location for the conference call cannot be changed.

19. The computer system of claim 8, wherein a moderator of the conference call is notified when the past quality of session is poor and the current quality of session is good.

* * * * *